(12) United States Patent
Yang et al.

(10) Patent No.: US 12,339,771 B2
(45) Date of Patent: Jun. 24, 2025

(54) SYSTEMS AND METHODS FOR WORKLOAD DISTRIBUTION ACROSS PROCESSING UNITS

(71) Applicant: Samsung Electronics Co., Ltd., Suwon-si (KR)

(72) Inventors: Jingpei Yang, San Jose, CA (US); Jing Yang, San Jose, CA (US); Rekha Pitchumani, Oak Hill, VA (US)

(73) Assignee: Samsung Electronics Co., Ltd., Yongin-si (KR)

( * ) Notice: Subject to any disclaimer, the term of this patent is extended or adjusted under 35 U.S.C. 154(b) by 587 days.

(21) Appl. No.: 17/528,030

(22) Filed: Nov. 16, 2021

(65) Prior Publication Data

US 2023/0089812 A1    Mar. 23, 2023

Related U.S. Application Data

(60) Provisional application No. 63/247,698, filed on Sep. 23, 2021.

(51) Int. Cl.
*G06F 12/06* (2006.01)
*G06F 3/06* (2006.01)
*G06F 12/02* (2006.01)

(52) U.S. Cl.
CPC .......... *G06F 12/063* (2013.01); *G06F 3/061* (2013.01); *G06F 3/0631* (2013.01); *G06F 3/0659* (2013.01); *G06F 12/0246* (2013.01); *G06F 3/0679* (2013.01)

(58) Field of Classification Search
CPC ...... G06F 3/061; G06F 3/0631; G06F 3/0659; G06F 3/0679; G06F 12/0246; G06F 12/063; G06F 2212/7201

USPC .......................................................... 711/102
See application file for complete search history.

(56) References Cited

U.S. PATENT DOCUMENTS

| | | | |
|---|---|---|---|
| 7,219,210 B2 * | 5/2007 | Russell | G06F 12/0284 711/170 |
| 8,977,660 B1 * | 3/2015 | Xin | H04N 21/23103 707/827 |
| 9,525,730 B2 | 12/2016 | Park et al. | |
| 9,785,460 B2 | 10/2017 | Zheng | |
| 10,466,938 B2 | 11/2019 | Seo et al. | |

(Continued)

FOREIGN PATENT DOCUMENTS

CN         111338793 A     6/2020

OTHER PUBLICATIONS

European Search Report for EP Application No. 22196361.4 dated Feb. 6, 2023, 12 pages.

*Primary Examiner* — Reginald G Bragdon
*Assistant Examiner* — Aaron D Ho
(74) *Attorney, Agent, or Firm* — Lewis Roca Rothgerber Christie LLP

(57) ABSTRACT

Workload distribution in a system including a non-volatile memory device is disclosed. A request is received including an address associated with a memory location of the non-volatile memory device. A hash value is calculated based on the address. A list of node values is searched, and one of the node values in the list is identified based on the hash value. A processor is identified based on the one of the node values, and the address is stored in association with the processor. The request is transmitted to the processor for accessing the memory location.

14 Claims, 10 Drawing Sheets

(56) References Cited

U.S. PATENT DOCUMENTS

| | | | |
|---|---|---|---|
| 10,474,497 B1* | 11/2019 | Kancharla | G06F 9/546 |
| 10,701,107 B2 | 6/2020 | Gopal et al. | |
| 10,776,321 B1* | 9/2020 | Balcha | G06F 16/1752 |
| 10,884,948 B2 | 1/2021 | Breslow | |
| 10,929,303 B2 | 2/2021 | Chung | |
| 10,977,189 B2 | 4/2021 | Conklin et al. | |
| 2004/0162953 A1* | 8/2004 | Yoshida | G06F 3/0617 |
| | | | 711/170 |
| 2009/0217029 A1* | 8/2009 | Ilac | H04L 9/0822 |
| | | | 713/151 |
| 2013/0054849 A1* | 2/2013 | Loh | G06F 13/4265 |
| | | | 710/100 |
| 2013/0151754 A1 | 6/2013 | Post et al. | |
| 2013/0159638 A1* | 6/2013 | Koinuma | G06F 12/1441 |
| | | | 711/E12.001 |
| 2013/0332608 A1* | 12/2013 | Shiga | G06F 9/5088 |
| | | | 709/226 |
| 2013/0336159 A1* | 12/2013 | Previdi | H04L 45/50 |
| | | | 370/254 |
| 2015/0006871 A1* | 1/2015 | Nachimuthu | G06F 21/78 |
| | | | 711/164 |
| 2015/0169229 A1* | 6/2015 | Tsuchiya | G06F 3/067 |
| | | | 711/114 |
| 2015/0350079 A1* | 12/2015 | Chen | H04L 45/7453 |
| | | | 709/238 |
| 2016/0105502 A1* | 4/2016 | Shen | H04L 45/44 |
| | | | 709/205 |
| 2016/0224389 A1* | 8/2016 | Guttahalli Krishna | |
| | | | G06F 3/0644 |
| 2016/0231939 A1* | 8/2016 | Cannata | G06F 3/0605 |
| 2018/0181328 A1 | 6/2018 | Espeseth et al. | |
| 2018/0316753 A1* | 11/2018 | Davis | H04L 67/10 |
| 2019/0227744 A1* | 7/2019 | Olarig | G06F 11/1076 |
| 2020/0004670 A1 | 1/2020 | Williams et al. | |
| 2021/0314404 A1* | 10/2021 | Glek | G06F 11/2041 |
| 2022/0043715 A1* | 2/2022 | Liao | G06F 16/188 |
| 2022/0200927 A1* | 6/2022 | Li | H04L 47/83 |
| 2022/0292068 A1* | 9/2022 | Lin | G06F 16/322 |

* cited by examiner

SYSTEMS AND METHODS FOR WORKLOAD DISTRIBUTION ACROSS PROCESSING UNITS

CROSS-REFERENCE TO RELATED APPLICATION(S)

The present application claims priority to and the benefit of U.S. Provisional Application No. 63/247,698, filed Sep. 23, 2021, entitled "METHOD FOR WORKLOAD BALANCING ACROSS FORCES USING CONSISTENT HASHING," the entire content of which is incorporated herein by reference.

FIELD

One or more aspects of embodiments according to the present disclosure relate to computational systems, and more particularly to distributing workloads to processing units of the computational systems.

BACKGROUND

Flash memory may be used as a non-volatile memory system to store different types of data including voice and image data. A memory card, such as a solid state drive (SSD), is an example of a storage device using a flash memory system.

A central processing unit (CPU) may be part of the flash memory system for managing input/output (I/O) operations of the flash memory. When there are multiple CPUs in the flash memory system, one of the CPUs is selected to handle the I/O request.

The above information disclosed in this Background section is only for enhancement of understanding of the background of the present disclosure, and therefore, it may contain information that does not form prior art.

SUMMARY

An embodiment of the present disclosure is directed to a method for workload distribution in a system having a non-volatile memory device. The method includes receiving a request including an address associated with a memory location of the non-volatile memory device; calculating a hash value based on the address; searching a list of node values; identifying one of the node values in the list based on the hash value; identifying a processor based on the one of the node values; storing the address in association with the processor; and transmitting the request to the processor for accessing the memory location.

According to one embodiment, the request includes a request to write data to the memory location.

According to one embodiment, the address includes a logical address.

According to one embodiment, the identifying of one of the node values is based on consistent hashing.

According to one embodiment, the list of node values represents a consistent hash ring.

According to one embodiment, the list of node values is a sorted list, wherein the identifying of the one of the node values includes identifying a first one of the node values in the list with a value equal or greater to the hash value.

According to one embodiment, the identifying the processor includes searching a table including a mapping of the node values to processor identifiers.

According to one embodiment, a processor identifier for the processor is stored in a bitmap in association with the address.

According to one embodiment, the processor includes an embedded processor, and the memory location identifies a location of a flash memory device.

According to one embodiment, the method further includes: identifying a trigger condition associated with the processor; identifying a node associated with the processor, wherein the node is identified via one of the node values; identifying an address range covered by the node; associating at least a portion of the address range to a second node; and mapping the second node to a second processor different from the processor.

An embodiment of the present disclosure is also directed to a non-volatile memory system, comprising: a non-volatile memory device; a first processor coupled to the non-volatile memory device; and a second processor coupled to the first processor. The second processor may be configured to: receive a request including an address associated with a memory location of the non-volatile memory device; calculate a hash value based on the location identifier; map the hash value onto a list of node values; identify one of the node values in the list based on the hash value; identify the first processor based on the one of the node values; store the location identifier in association with the first processor; and transmit the request to the first processor for accessing the memory location.

As a person of skill in the art should recognize, use of hashing (e.g. consistent hashing) to identify a node value of a virtual CPU that is further mapped to a physical CPU may allow balanced workload distribution to multiple physical CPUs in a non-volatile memory system. In addition, the ability to add (or delete) new node values associated with the virtual CPUs helps the system minimize the negative effects of die failures or other drive condition changes.

These and other features, aspects and advantages of the embodiments of the present disclosure will be more fully understood when considered with respect to the following detailed description, appended claims, and accompanying drawings. Of course, the actual scope of the invention is defined by the appended claims.

BRIEF DESCRIPTION OF THE DRAWINGS

Non-limiting and non-exhaustive embodiments of the present embodiments are described with reference to the following figures, wherein like reference numerals refer to like parts throughout the various views unless otherwise specified.

DETAILED DESCRIPTION

Figure 1:
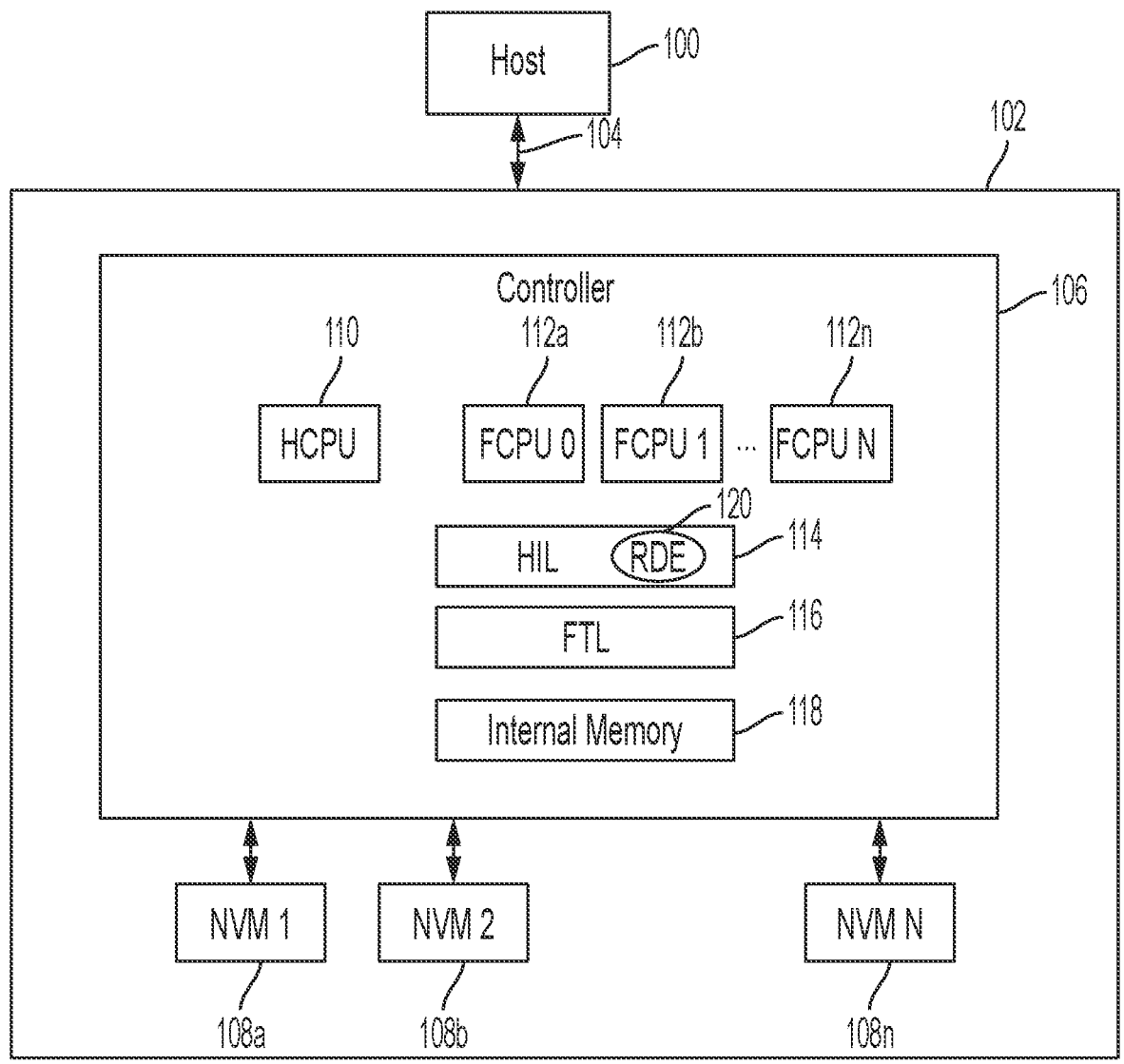
FIG. 1 is a block diagram of a system for distributing data requests according to one embodiment.

Hereinafter, example embodiments will be described in more detail with reference to the accompanying drawings, in which like reference numbers refer to like elements throughout. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, descriptions thereof may not be repeated. Further, in the drawings, the relative sizes of elements, layers, and regions may be exaggerated and/or simplified for clarity.

A central processing unit (CPU) may be part of the flash memory system for managing input/output (I/O) operations of the flash memory. When there are multiple CPUs in the flash memory system, it may be desirable to distribute the I/O requests to the multiple CPUs to achieve balanced workload distribution When a flash memory system includes various embedded central processing units (CPUs), one traditional mechanism for identifying one of the CPUs to process an I/O request may be, for example, via a mathematical calculation. For example, a modulo operation may be performed based on the logical block address (LBA) of the I/O request and the total number of CPUs in the flash memory system (e.g. by taking the LBA and performing a modulus operation based on a total CPUs). Such a math operation may operate to distribute the workloads among the embedded CPUs in a manner similar to round robin.

One problem with the use of a mathematical calculation like the one above, is that it may cause performance degradation on random write instructions in the event of hardware failure of the flash memory system. For example, upon die failure, data on the failed die is typically remapped to an over provisioning (OP) space for the corresponding CPU. This may result in more garbage collection (GC) activities and less over provisioning (OP) space, which may degrade performance of the CPU. For example, an approximately 1.5% OP space reduction may cause more than an approximately 10% performance drop on the associated CPU. As random write performance may be bounded by the slowest CPU, the CPU may become the bottleneck for the flash memory system. In addition, more writes caused by GC activities on the CPU may cause issues like wear-leveling and potential higher failure ratio, resulting in even lower performance of the CPU. Thus, it is desirable to have a system and method that provides workload balance across various embedded CPUs while efficiently addressing issues such as die failures.

Embodiments of the present disclosure are directed to using consistent hashing for identifying virtual CPUs (also referred to as "nodes") that are mapped to physical CPUs, for balancing write requests to the flash memory system. In general terms consistent hashing is a distributed hashing scheme that does not depend on a number of nodes in a distributed hash table. In this regard, a hash ring is employed where the output range of a hash function is treated as a fixed circular space referred to as the hash ring, with the largest hash value wrapping around to the smallest hash value. In one embodiment, a request distribution engine employs consistent hashing to map the LBA of a write request to a virtual CPU, and further identifies the physical CPU that is mapped to the virtual CPU. The write request may be forwarded to the identified physical CPU for handling.

In one embodiment, the physical CPU that is identified for the LBA may be stored in a bitmap or in any suitable format. The CPU information stored in the bitmap may be used to process read requests. In this regard, the request processing engine identifies an LBA in a read request, and retrieves the bitmap for determining the CPU that is mapped to the LBA. The read request may be sent to the identified CPU for handling.

In one embodiment, the request distribution engine adds or reduces virtual nodes for a physical CPU based on a sensed condition. One example condition may be failure of a flash memory die. In the event of memory die failure, a virtual node may be added to reduce traffic to the physical CPU with the failed die. The added virtual node may be mapped to a physical CPU other than the CPU with the failed die. In one embodiment, the use of consistent hashing minimizes the keys that have to be remapped due to the addition of the virtual node.

FIG. 1 is a block diagram of a system for distributing data requests according to one embodiment. In one embodiment, the system includes a host device 100 coupled to a non-volatile memory (NVM) system 102 over a storage interface bus 104. The host 100 may be a computing device including, for example, a server, a portable electronic device such as a portable multimedia player (PMP), a personal digital assistant (PDA), or a smart phone, an electronic device such as a computer or a high-definition television (HDTV), or an application processor installed in any such electronic devices.

In one embodiment, the host 100 makes I/O requests for writing and reading data to and from the NVM system 102, over the storage interface bus 104, using a storage interface protocol. The storage interface bus 106 may be, for example, a Peripheral Component Interconnect Express (PCIe) bus. The storage interface protocol may be, for example, a non-volatile memory express (NVMe) protocol.

In one embodiment, the NVM system 102 may include a solid state drive (SSD), although embodiments of the present disclosure are not limited thereto. The NVM system 102 may include a memory controller 106 and one or more NVM devices 108*a*-108*n* (collectively referenced as 108). In one embodiment, the NVM devices 108 include a flash memory device. The controller 106 may be configured to access the NVM devices 108 through at least one channel. For example, the NVM system 102 may include N channels Ch1 to ChN, and the memory controller 106 may be configured to access the NVM devices 108 through the N channels Ch1 to ChN.

The controller 106 may also include at least one central processing unit (CPU) (hereinafter referred to as the HCPU 110), a plurality of second processors 112*a*-112*n* (collectively referenced as 112), host interface layer (HIL) 114, flash translation layer (FTL) 116, and internal memory 118. The internal memory 118 may include a DRAM (dynamic random access memory), SRAM (static random access memory), and/or DTCM (Data Tightly Coupled Memory).

In one embodiment, the HCPU 110 is configured to execute the HIL 114 for processing requests from the host 100 such as, for example, read or write requests, and generating internal requests for processing by the second processors 112. The HIL 114 may be realized as firmware and may be loaded on the internal memory 118 for being executed by the HCPU 110.

In one embodiment, the second processors 112 are configured to receive requests from the HCPU 110 and access data stored in the NVM devices 108 based on the memory addresses contained in the requests. When the non-volatile memory devices 108 include a flash memory device, the second processors may execute the FTL 116 to interface with the NVM devices 108. In this regard, the FTL 116 may include system software (or firmware) for managing writing, reading, and erasing operations of the flash memory device, and may be loaded on the internal memory 118 and operated by the second processors 112. The second processors 112, referred to herein as FTL CPUs (FCPUs) 112 may be configured to operate the FLT. In one embodiment, the FTL may include a mapping table including information for converting between a logical address and a physical address.

In one embodiment, the HIL 114 includes a request distribution engine 120 that selects one of the FCPUs 112 for processing a request from the host 100. In this regard, the request distribution engine 120 first identifies a virtual CPU node applying consistent hashing to the memory address included in the request. In one embodiment, the internal memory 118 stores a table with a mapping of virtual CPU nodes to FCPUs 112. In one embodiment, the request distribution engine 120 accesses the table to identify the FCPU 112 that corresponds to the identified virtual CPU. The request distribution engine 120 may transmit an internal request to the identified FCPU 112 for processing the request. In this manner, workloads may be distributed to the various FCPUs 112 in a balanced manner. Furthermore, use of consistent hashing may allow one or more virtual CPUs and associated FCPUs 112 to be added and/or removed while minimizing the remapping of key values to the virtual CPUs, and migration associated migration of data due to the remapping.

Figure 2A:
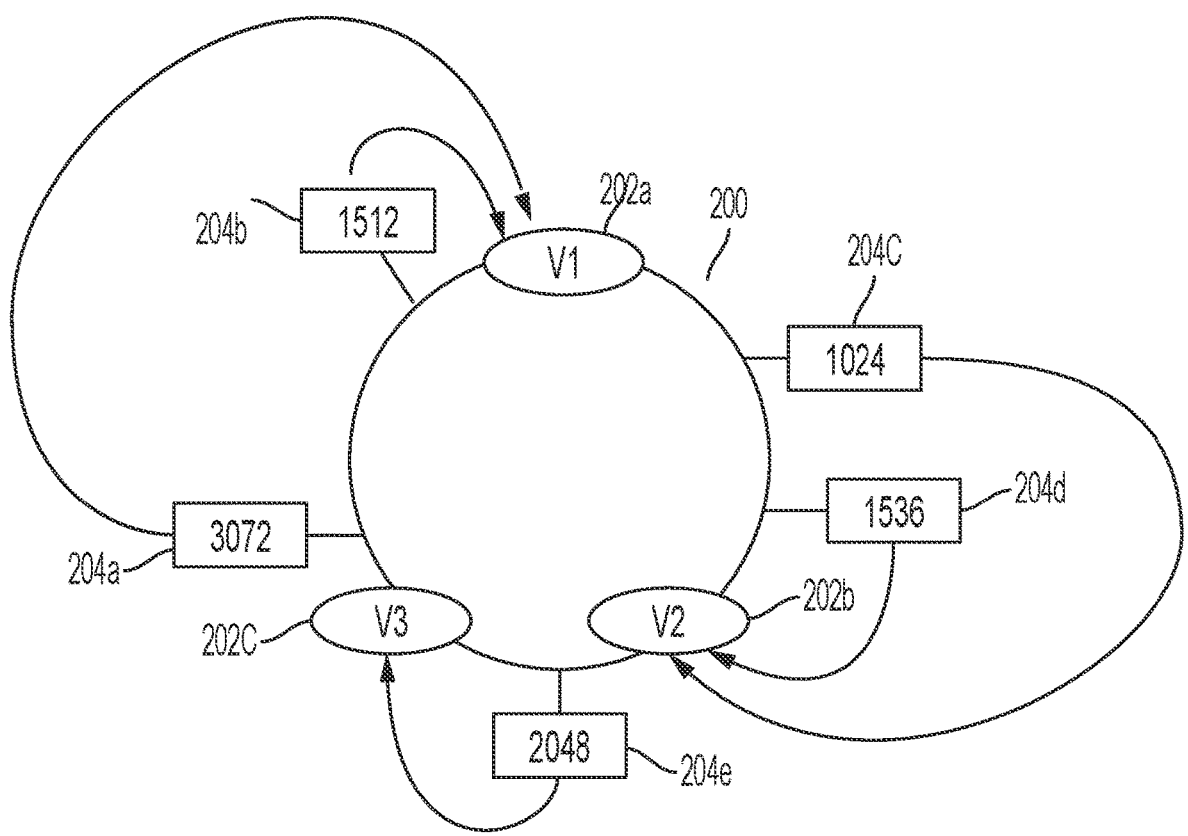
FIG. 2A is a conceptual block diagrams of an example hash ring used with consistent hashing according to one embodiment.

FIG. 2A represents a conceptual block diagram of an example hash ring 200 used with consistent hashing according to one embodiment.

One or more virtual CPUs (nodes) 202a-202c (collectively referenced as 202) may be assigned a position on the hash ring 200. In one embodiment, the position of the nodes is determined using a hash function that uses an LBA address as a key. The LBA address that is used as the key may be in an address range that is assigned to (or covered by) the node. The address ranges covered by the nodes may be the same or different from one another. For example, assuming an approximately 1.2 TB flash memory system, the first virtual CPU 202a may cover approximately LBA 0-400 GB, the second virtual CPU 202b may cover approximately LBA 400-800 GB, and the third virtual CPU 202c may cover approximately LBA 800-1200 GB. In one embodiment, the ending LBA address in the range is used as the key for computing the hash value for the virtual CPU 202. In some implementations, a beginning address in the range may be used in lieu of the end address.

Figure 2B:
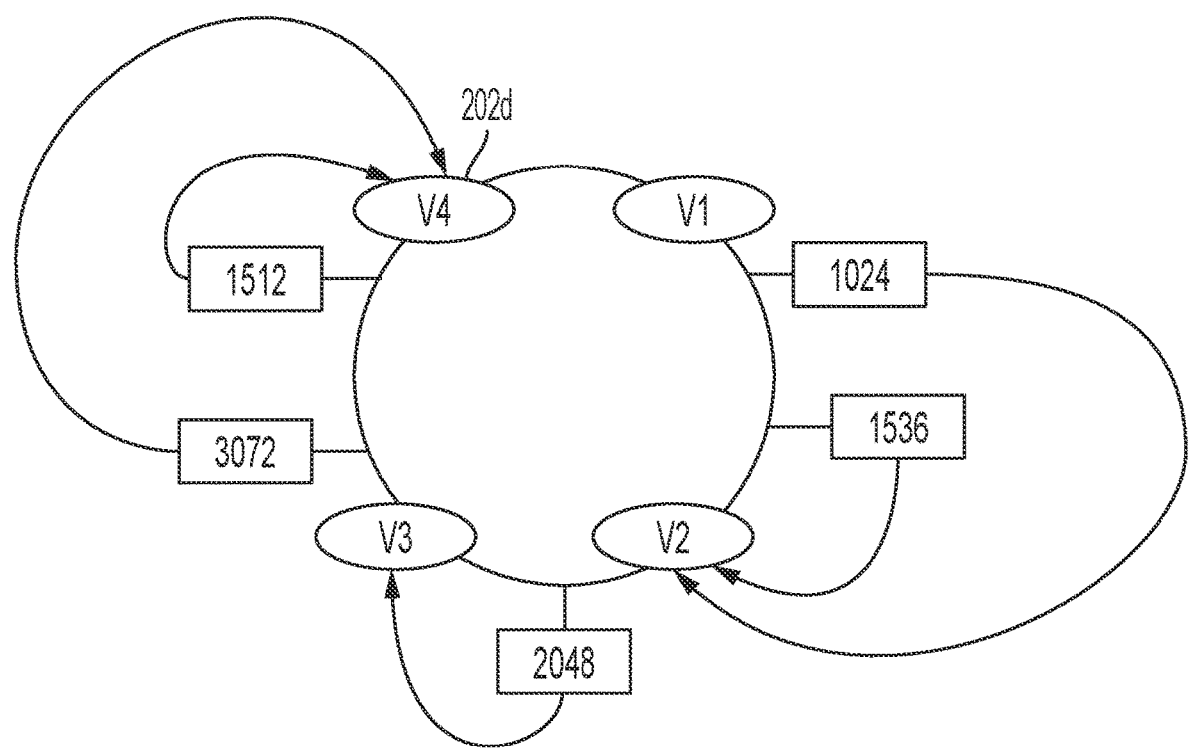
FIG. 2B is a conceptual block diagram of the hash ring of FIG. 2A, that adds an additional node to the ring according to one embodiment.
Figure 2C:
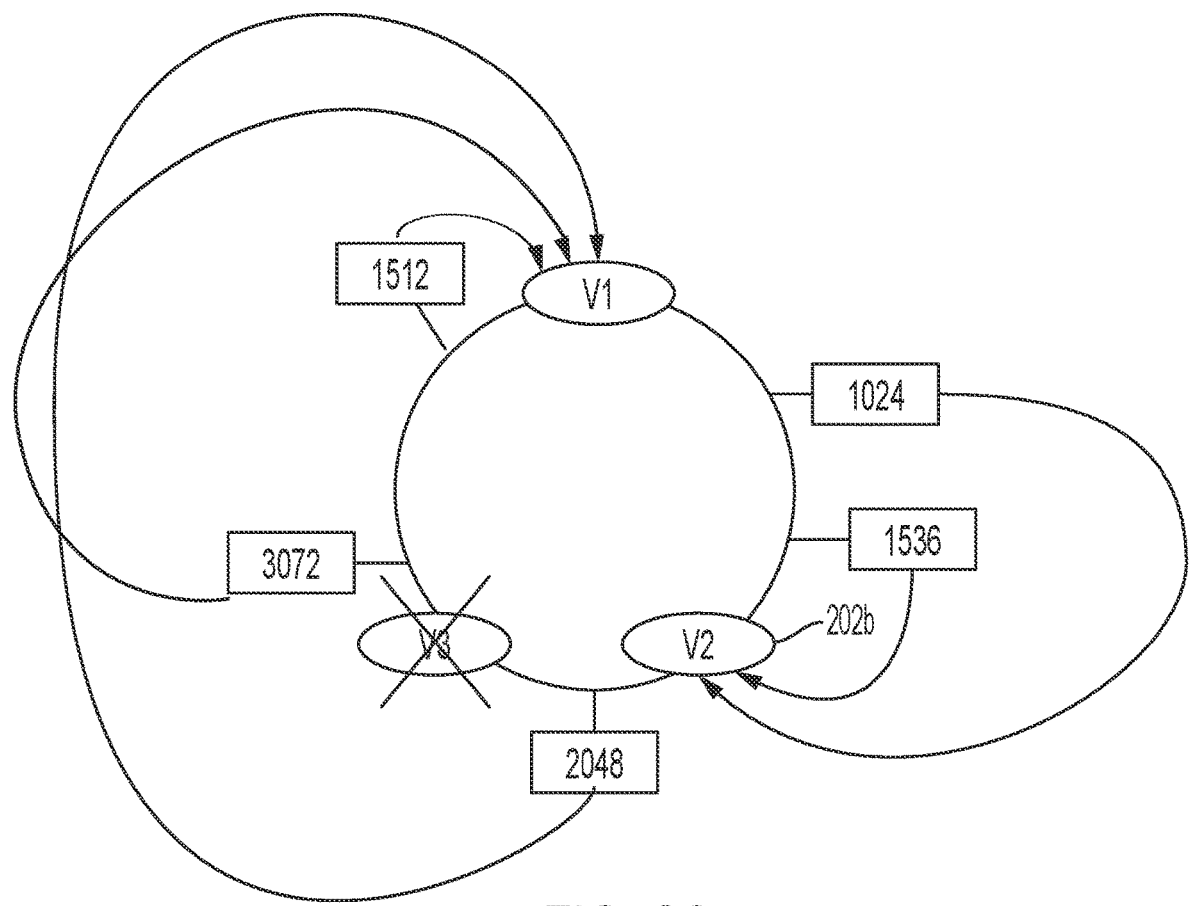
FIG. 2C is a conceptual block diagram of the hash ring of FIG. 2A, that removes a node from the ring according to one embodiment.

The request distribution engine 120 may also assign one or more objects 204a-204e (collectively referenced as 204), a position on the hash ring 200, for selecting a node to which the object is to be assigned. The objects may be, for example, memory addresses or other keys provided in an I/O request by the host 100. In the example of FIGS. 2A-2C, the objects 204 are LBA addresses.

In one embodiment, the I/O request that triggers the mapping of objects on the hash ring includes a write request. In one embodiment, the same hash function used to determine the positions of the virtual CPUs 202 is used to determine the position of memory addresses in the write requests. In this regard, in order to determine a position of the objects 204 on the hash ring, the memory addresses of the objects 204 may be provided to the hash function for determining corresponding hash values. The objects 204 may then be positioned on the hash ring based on the corresponding hash values.

In one embodiment, once the memory address of a write request is mapped on the hash ring 200, the request distribution engine 120 invokes an assignment algorithm to assign a virtual CPU 202 to the memory address. The assignment algorithm may cause, for example, selection of a virtual CPU 202 that has a hash value closest to the hash value of the inbound object, in a clockwise direction (e.g. in a direction where the hash values increase) or a counterclockwise direction (e.g. in a direction where the hash values decrease) on the hash ring 200.

In the embodiment where the rule is to search in the clockwise direction with increasing hash values, the example memory address objects 204 of FIG. 2A may be assigned to the nodes 202 as follows: object 204b to the first virtual CPU 202a; objects 204d and 204e to the second virtual CPU 202b; and object 204f to the third virtual CPU 202c. In the example of FIG. 2, object 204a has a hash value bigger than the hash value of the third virtual CPU 202c, which is the virtual CPU with the highest hash value. Given that there are no virtual CPUs with a hash value bigger than virtual CPU 202c, object 204f is also assigned to the first virtual CPU 202a.

In one embodiment, the disclosed systems may implement the hash ring via a data structure that stores the hash values of the virtual CPUs 202 as an ordered list. A list of the virtual CPUs 202 may also be maintained as a separate list. In one embodiment, the list of hash values may be searched using any searching algorithm (e.g. binary search) to find the first hash value (and associated virtual CPU) that is greater than the hash value of the object in the request from the host 100. If no such value is found, the search algorithm may wrap around to find the first hash value (and associated virtual CPU) in the list.

Once the virtual CPU is selected 202 for an incoming object, the request delivery engine 120 may identify an FCPU 112 associated with the selected virtual CPU 202. In one embodiment, the request delivery engine 120 searches a table mapping the virtual CPUs 202 to the FCPUs 112. The request associated with the incoming object may then be delivered to the appropriate FCPU for processing.

In some situations, it may be desirable to add or delete a node 202 from the hash ring 200, after the hash ring has been in use. For example, it may be desirable to add or remove a node 202 in the event of die failure of an associated FCPUs 112, in order to minimize traffic to the FCPU.

FIG. 2B is a conceptual block diagram of the hash ring 200 of FIG. 2A, that adds a fourth virtual CPU 202d to the ring. The fourth virtual CPU 202d may cover all or a portion of the address ranges covered by the first virtual CPU 202a. In this regard, the location of the fourth virtual CPU 202d may be determined by calculating a hash value of the last address in the range that is now covered by the fourth virtual CPU 202d. Thus, objects with an address range previously covered by the first virtual CPU 202*a*, but now covered by the fourth virtual CPU 202*d*, may be assigned to the fourth virtual CPU 202*d* instead of the first virtual CPU 202*a*. This may help minimize traffic to the FCPU assigned to the first virtual CPU 202*a*. The assignments of other objects, however, may remain the same.

FIG. 2C is a conceptual block diagram of the hash ring 200 of FIG. 2A, that removes the third virtual CPU 202*c* from the ring. The deletion of the third virtual CPU 202*c* causes an object 204*e* that would have been assigned to the third virtual CPU 202*c*, to now be assigned to the first virtual CPU 202*a*. The other assignments, however, remain the same.

Figure 3A:
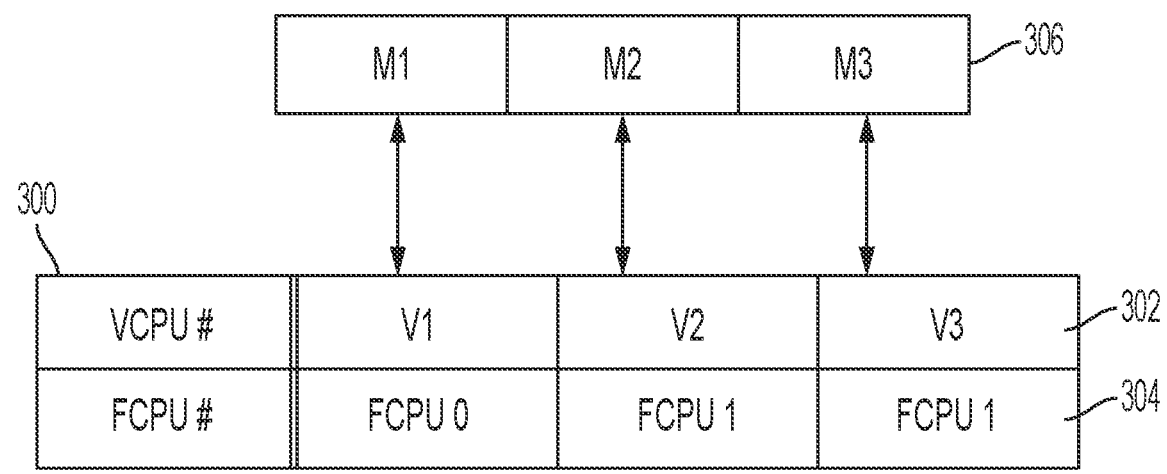
FIG. 3A is an exemplary mapping table of virtual CPUs to physical CPUs according to one embodiment.

FIG. 3A is an exemplary mapping table 300 of virtual CPUs 202 to FCPUs (also referred to as physical CPUs) 112 according to one embodiment. The mapping table may be stored, for example, in the internal memory 118. In one embodiment, the mapping table 300 includes a list of virtual CPU IDs 302 mapped to corresponding FCPU IDs 304. The mapping of virtual CPUs to FCPUs may be determined, for example, by an administrator based on capabilities of the FCPU. For example, the more the power of an FCPU, the more the number of virtual CPUs assigned to the FCPU.

Figure 3B:
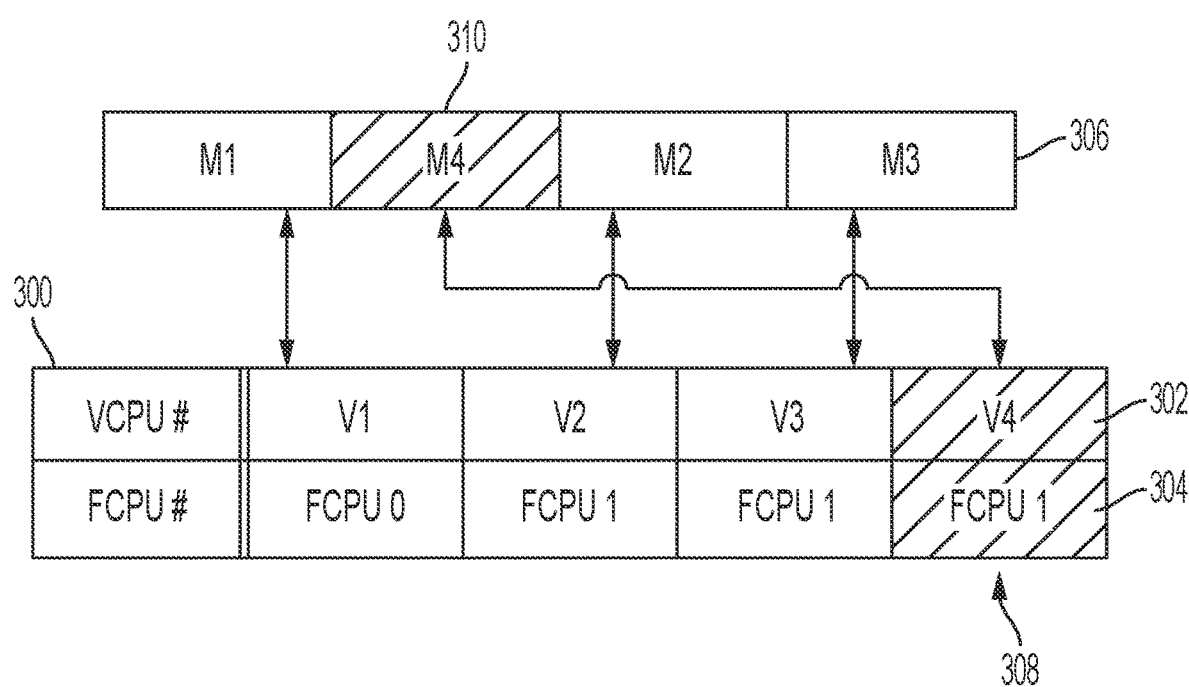
FIG. 3B is the mapping table of FIG. 3A, that adds an entry for a new virtual CPU according to one embodiment.

In one embodiment, the list of virtual CPU IDs 302 are further mapped to a list of hash values 306 that identify a position of the virtual CPU 202 on the hash ring 200. In one embodiment, the hash values are stored in a data structure as an ordered list. In the event that a new virtual CPU 308 is added to the mapping table 300 as exemplified in FIG. 3B, the hash value of the new virtual CPU is computed and inserted into the list 306, in sorted order.

Figure 4:
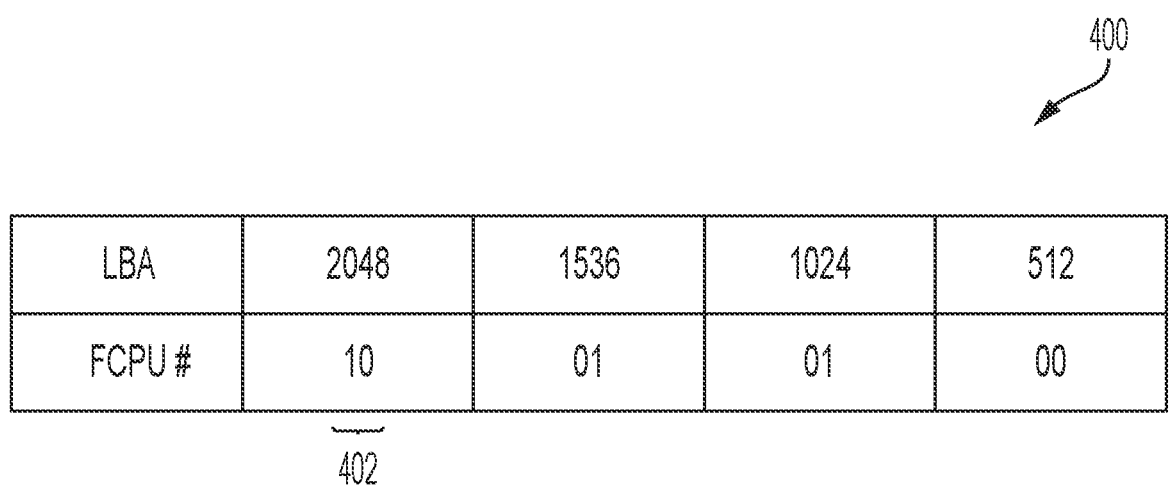
FIG. 4 is a conceptual block diagram of an example bitmap according to one embodiment.

In one embodiment, the internal memory 118 further stores a bitmap that provides FCPU IDs for different LBAs. FIG. 4 is a conceptual block diagram of an example bitmap 400 according to one embodiment. The number of bits 402 in the bitmap may depend on the number of FCPUs 112 to be identified, and the number of LBAs to be mapped to the FCPUs. In the example of FIG. 4 two bits are used to identify up to four different FCPUs. Thus, in the example of FIG. 4, every two bits of the bitmap identify the FCPU ID assigned to an LBA. Although in the example of FIG. 4, only four LBAs are represented, but it should be appreciated that the bitmap may represent all possible LBAs that may be determined based on the storage capacity of the NVM system 102.

In one embodiment, the request distribution engine 120 updates the bitmap 400 in response to a write request. The write request may include the LBA associated with a memory location of the NVM 102 where data is to be stored. As described, the request distribution engine 120 identifies the virtual CPU 202 to handle the write request, and maps the virtual CPU 202 to the corresponding FCPU 112. In one embodiment, the request distribution engine 120 stores the identifier of the FCPU 112 in a portion of the bitmap 400 that corresponds to the LBA of the write request.

In one embodiment, the request distribution engine 120 references the bitmap 400 in response to a read request from the host 100. In this regard, the request distribution engine 120 may search the portion of the bitmap corresponding to the LBA of the read request to retrieve the stored FCPU ID. The request distribution engine 120 may then direct the read request to the identified FCPU for handling. As a person of skill in the art should appreciate, the extra processing overhead of calculating hash values, determining virtual CPU IDs based on calculated hash values, and further identifying the FCPU of the virtual CPU, may be avoided by storing the LBA-to-FCPU mapping in the bitmap 400 in the internal memory 118. In terms of memory space, in the example of an approximately 1 TB drive with an approximately 4 KB page unit, the bitmap may represent approximately a total 256M addresses, translating to approximately 64 MB of memory space in the event that drive includes four FCPUs (256M/8 bit*(2 bit/address)=64 MB).

Figure 5:
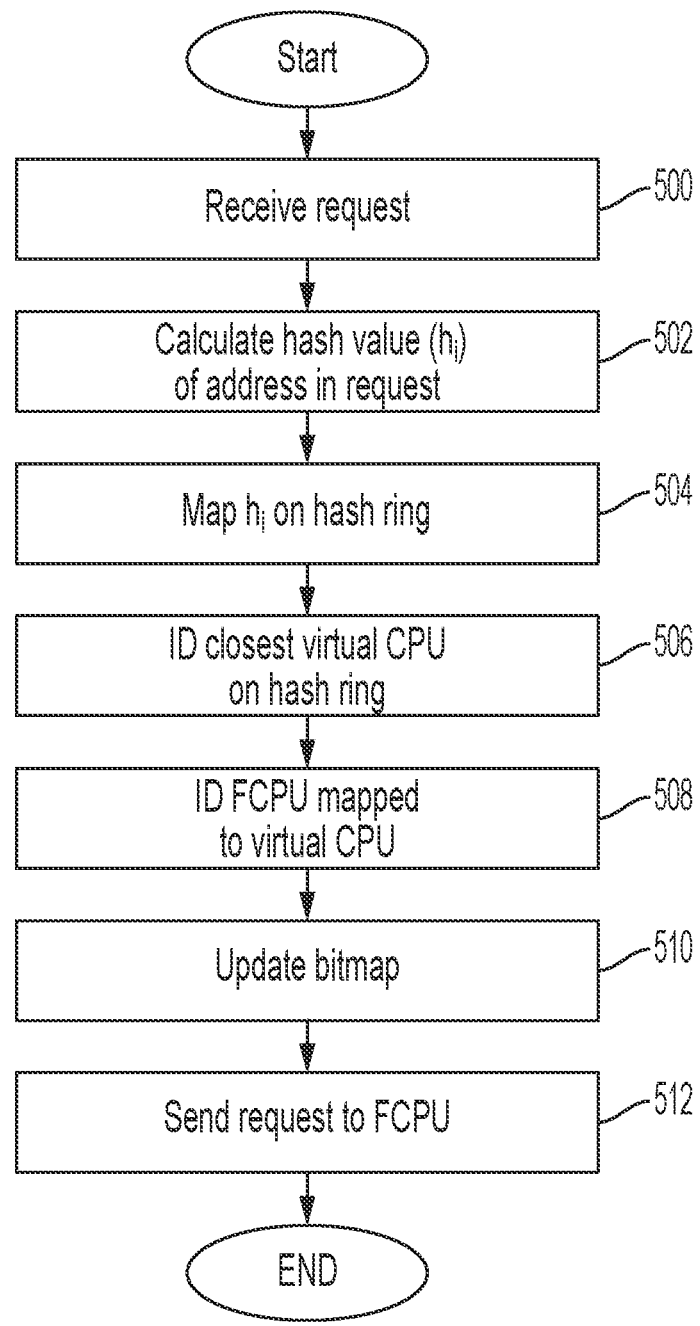
FIG. 5 is a flow diagram of a process for processing a first access request according to one embodiment.

FIG. 5 is a flow diagram of a process for processing a first access request according to one embodiment. The first access request may be, for example, a write request. The process starts, and at block 500, the HIL 114 receives the write request from the host 100. The write request may include an address (e.g. LBA) associated with a memory location of the NVM device 108 to where data is to be written.

In response to receipt of the write request, the HCPU 110 invokes the request distribution engine 120 to identify the FCUP that is to handle the write request. In this regard, the request distribution engine 120, at block 502, calculates a hash value (h1) based on the address of the write request. A hash function, such as an MD5 hash function, may be used to calculate the hash value.

At block 504, the request distribution engine 120 maps h1 on a hash ring (e.g. hash ring 200). The hash ring may be implemented as a sorted list of hash values (also referred to as node values) corresponding to the virtual CPUs (e.g. virtual CPUs 202), and the mapping of h1 onto the hash ring may entail comparing h1 to the hash values in the list, for identifying a position of h1 on the list.

At block 506, the request distribution engine 120 invokes a searching algorithm to find a closest virtual CPU (node) on the hash ring (e.g. hash ring 200) whose hash value is greater than h1. The searching algorithm may be, for example, a binary search algorithm that searches the list of hash values until it identifies the first hash value that is equal or greater than h1. The searching algorithm may return the virtual CPU ID of the identified hash value in the list.

In one embodiment, if h1 is greater than any hash value in the list, and the searching algorithm reaches the end of the list without finding a hash value that is equal or greater than h1, the searching algorithm may wrap around the list and identify the first hash value in the list. The searching algorithm may return the virtual CPU ID of the first hash value in the list as the virtual CPU that is to handle the request.

At block 508, the request distribution engine 120 searches a mapping table (e.g. mapping table 300) to identify the FCPU 112 mapped to the returned virtual CPU ID.

At block 510, the request distribution engine 120 updates a bitmap (e.g. bitmap 400) of FCPU IDs. In this regard, the request distribution engine identifies a preset number of bits (e.g. two bits) of the bitmap corresponding to the LBA in the write request, and stores the FCPU ID in the identified bits of the bitmap.

At block 512, the HIL 114 transmits the request to the FCPU 112 to access the memory location in the write request, and cause the NVM device 108 to write data in the accessed memory location.

Figure 6:
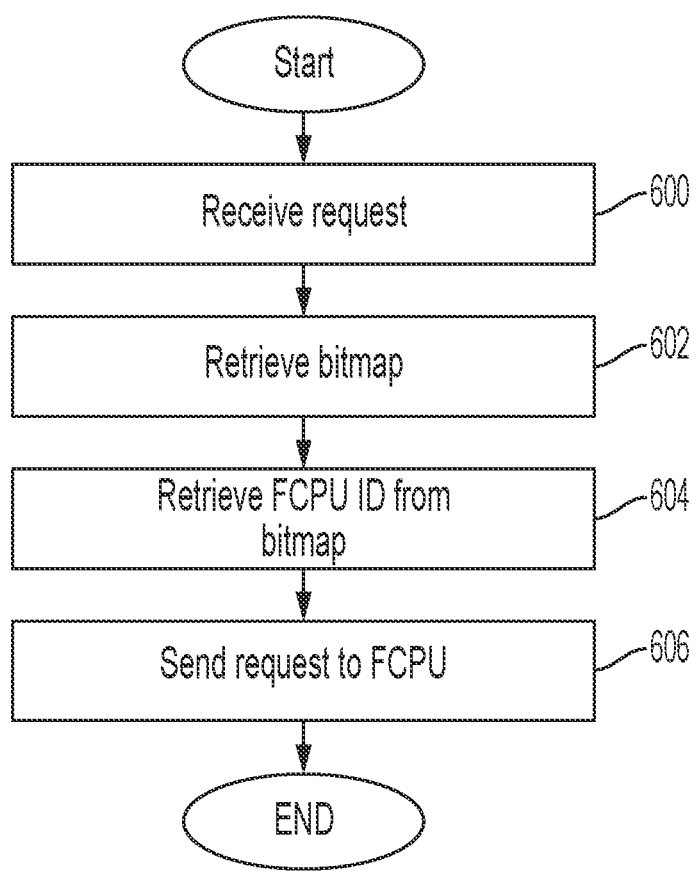
FIG. 6 is a flow diagram of a process for processing a second access request according to one embodiment.

FIG. 6 is a flow diagram of a process for processing a second access request according to one embodiment. The second access request may be, for example, a read request. The process starts, and at block 600, the HIL receives the read request from the host 100. The read request may include an address associated with a memory location of the NVM device 108 from where data is to be read. The memory location may be the memory location associated with a prior write request.

In response to receipt of the read request, the HCPU 110 invokes the request distribution engine 120 to identify the FCPU that is to handle the read request. In this regard, the request distribution engine 120, at block 602, retrieves a bitmap (e.g. bitmap 400) of FCPU IDs.

At bock 604, the request distribution engine 120 locates bits of the bitmap corresponding to the address in the read request, and retrieves the FCPU ID from the located bits.

At block 606, the HIL 114 transmits the read request to the identified FCPU 112 to access the memory location in the read request, and cause the NVM device 108 to read data in the accessed memory location.

Figure 7:
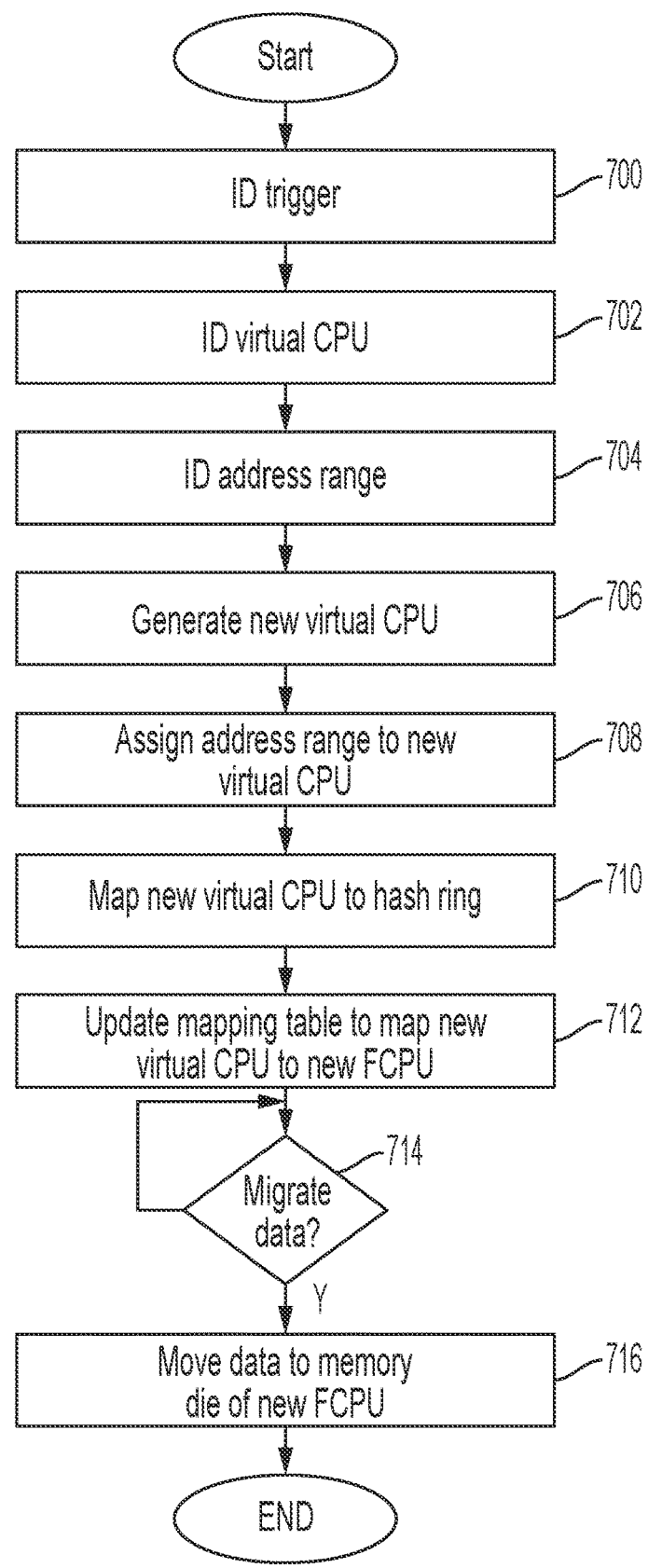
FIG. 7 is a flow diagram of a process for adding a virtual node to a hash ring according to one embodiment.

FIG. 7 is a flow diagram of a process for adding a virtual node to a hash ring according to one embodiment. The process starts, and at block 700, the request distribution engine 120 monitors and identifies a trigger for adding the virtual node. The trigger may be, for example, failure of a memory die of an NVM device 108 controlled by a first FCPU selected from the various FCPUs 112.

At block 702, the request distribution engine 120 identifies a first virtual CPU associated with the first FCPU 112 by, for example, referencing the mapping table 300.

At block 704, the request distribution engine 120 determines the address range covered by the first virtual CPU.

At block 706, the request distribution engine 120 generates a new virtual CPU, and at block 708, assigns at least part of the address range covered by the first virtual CPU, to the new virtual CPU. For example, assuming that the address range of the first virtual CPU is LBA 0-400 GB, the new virtual CPU may be assigned LBA 0-300 GB while the first virtual CPU retains LBA 300-400, to help reduce traffic to the first virtual CPU.

At block 710, the request distribution engine 120 maps the new virtual CPU on the hash ring 200. In this regard, the request distribution engine 120 may compute a hash value for the new virtual CPU based on, for example, the last address in the range of addresses (e.g. LBA 300) covered by the new virtual CPU.

At block 712, the mapping table 300 is updated with information on the new virtual CPU. For example, the new virtual CPU may be assigned to a second FCPU different from the first FCPU that is associated with, for example, the failed die.

At block 714, a determination is made as to whether the data stored in the memory addresses now covered by the second FCPU should be transferred from the memory die of the NVM device 108 of the first FCPU. For example, data in LBA 0-300 may be migrated from the memory die of the NVM device 108 associated with the first FCPU, to the memory die of the NVM device associated with the second FCPU.

The data migration need not happen immediately. For example, a condition may be monitored to determine whether data migration should be performed. In one example, the condition may be start of a garbage collection process. In this regard, at block 716, data may be migrated from the memory die of the first FCPU to the second FCPU, during the garbage collection process.

In one embodiment, the request distribution engine 120 may further delete an existing virtual CPU based on a monitored condition. For example, it may be desirable to delete a node when requests to the corresponding FCPU of the node are more (e.g. 25% more) than other FCPUs, or there are more garbage collection activities in the corresponding FCPU than other FCPUs. In one embodiment, the deleting of a virtual CPU may simply entail removing the virtual CPU ID and associated hash value, from the mapping table 300 and associated hash list 306. In one embodiment, when the virtual CPU ID is removed from the hash ring, an adjacent virtual CPU in the clockwise direction assumes the LBA addresses previously covered by the removed virtual CPU.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed herein could be termed a second element, component, region, layer or section, without departing from the spirit and scope of the inventive concept.

It should also be understood that the sequence of steps of the processes in FIGS. 5-7 are not fixed, but can be modified, changed in order, performed differently, performed sequentially, concurrently, or simultaneously, or altered into any desired sequence, as recognized by a person of skill in the art.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present disclosure". Also, the term "exemplary" is intended to refer to an example or illustration. As used herein, the terms "use," "using," and "used" may be considered synonymous with the terms "utilize," "utilizing," and "utilized," respectively.

Although exemplary embodiments of a system and method for workload distribution in an NVM system have been specifically described and illustrated herein, many modifications and variations will be apparent to those skilled in the art. Accordingly, it is to be understood that a system and method for workload distribution in an NVM system constructed according to principles of this disclosure may be embodied other than as specifically described herein. The disclosure is also defined in the following claims, and equivalents thereof.

What is claimed is:

1. A method for workload distribution in a system having a non-volatile memory device, comprising:
   associating a first node value to a first virtual node, wherein the first node value is generated based on a first range of addresses assigned to the first virtual node that identify one or more first memory locations of the non-volatile memory device;
   receiving a write request including an address from the first range of addresses associated with a memory location of the non-volatile memory device from the one or more first memory locations;
   based on receiving the write request:
      calculating a hash value based on the address in the write request;

searching a list of node values including the first node value;

identifying the first node value from the list based on the hash value;

identifying from a first data structure storing a mapping of the list of node values to a plurality of processors, an identifier of a first processor of the plurality of processors associated with the first virtual node based on the first node value;

storing in a second data structure a mapping of the address in the write request to the identifier of the first processor; and transmitting the write request to the first processor for writing to the memory location;

receiving a read request including the address;

based on receiving the read request:

retrieving from the second data structure the identifier of the first processor mapped to the address; and based on retrieving the identifier of the first processor from the second data structure, transmitting the read request to the first processor for reading from the memory location;

identifying a condition associated with the first processor;

based on identifying the condition:

identifying the first virtual node associated with the first processor, wherein the first virtual node is identified via the first node value;

identifying the first range of addresses assigned to the first virtual node;

associating at least a portion of the first range of addresses to a second virtual node;

modifying the first data structure for storing a mapping of the second virtual node to a second processor different from the first processor; and changing a state of the first node value in the list of node values.

2. The method of claim 1, wherein the address includes a logical address.

3. The method of claim 1, wherein the identifying the first node value is based on consistent hashing.

4. The method of claim 3, wherein the list of node values represents a consistent hash ring.

5. The method of claim 1, wherein the list of node values is a sorted list, wherein the identifying of the first node value includes identifying a first one of the node values in the list with a value equal or greater to the hash value.

6. The method of claim 1, wherein the second data structure includes a bitmap storing the identifier of the first processor in association with the address.

7. The method of claim 1, wherein the first processor includes an embedded processor, and the memory location identifies a location of a flash memory device.

8. A non-volatile memory system, comprising:

a non-volatile memory device;

a first processor coupled to the non-volatile memory device;

a second processor coupled to the non-volatile memory device; and a third processor coupled to the first processor and the second processor, the third processor being configured to:

associate a first node value to a first virtual node, wherein the first node value is generated based on a first range of addresses assigned to the first virtual node that identify one or more first memory locations of the non-volatile memory device;

receive a write request including an address from the first range of addresses associated with a memory location of the non-volatile memory device from the one or more first memory locations;

based on the third processor being configured to receive the write request:

calculate a hash value based on the address in the write request;

search a list of node values including the first node value;

identify the first node value from the list based on the hash value;

identify from a first data structure storing a mapping of the list of node values to a plurality of processors, an identifier of the first processor of the plurality of processors associated with the first virtual node based on the first node value;

store in a second data structure a mapping of the address in the write request to the identifier of the first processor; and transmit the write request to the first processor for writing to the memory location;

receive a read request including the address;

based on receiving the read request:

retrieve from the second data structure the identifier of the first processor mapped to the address; and based on retrieving the identifier of the first processor from the second data structure, transmit the read request to the first processor for reading from the memory location;

identify a condition associated with the first processor;

based on identifying the condition:

identify the first virtual node associated with the first processor, wherein the first virtual node is identified via the first node value;

identify the first range of addresses assigned to the first virtual node;

associate at least a portion of the first range of addresses to a second virtual node;

modify the first data structure for storing a map of the second virtual node to the second processor different from the first processor; and change a state of the first node value in the list of node values.

9. The system of claim 8, wherein the address includes a logical address.

10. The system of claim 8, wherein the identifying the first node value is based on consistent hashing.

11. The system of claim 10, wherein the list of node values represents a consistent hash ring.

12. The system of claim 8, wherein the list of node values is a sorted list, wherein the third processor is configured to identify the first node value include instructions that cause the third processor to identify a first one of the node values in the list with a value equal or greater to the hash value.

13. The system of claim 8, wherein the second data structure includes a bitmap storing the identifier of the first processor in association with the address.

14. The system of claim 8, wherein the first processor includes an embedded processor, and the memory location identifies a location of a flash memory device.

* * * * *